United States Patent

Stern et al.

Patent Number: 5,114,101
Date of Patent: May 19, 1992

[54] MODULAR DISTRIBUTED CONCENTRATING COLLECTOR USING POWER BUS TO ROUTE POWER TO CENTRALIZED CONVERTER

[75] Inventors: Theodore G. Stern; Mickey Cornwall, both of San Diego, Calif.

[73] Assignee: General Dynamics Corporation/Space Systems Division, San Diego, Calif.

[21] Appl. No.: 643,707

[22] Filed: Jan. 22, 1991

Related U.S. Application Data

[63] Continuation of Ser. No. 414,491, Sep. 28, 1989, abandoned.

[51] Int. Cl.⁵ .............................................. B24G 1/44
[52] U.S. Cl. ................................. 244/173; 136/292; 126/440
[58] Field of Search ............... 244/158 R, 173, 159; 126/438, 439, 425, 451, 440; 136/286, 247, 292

[56] References Cited

U.S. PATENT DOCUMENTS

| | | | |
|---|---|---|---|
| 3,781,647 | 12/1973 | Glaser | 244/159 |
| 4,201,197 | 5/1980 | Dismer | 126/439 |
| 4,257,401 | 3/1981 | Daniels | 126/440 |
| 4,282,858 | 8/1981 | Bowers | 126/480 |
| 4,307,936 | 12/1981 | Ochiai | 126/438 |
| 4,415,759 | 11/1983 | Copeland et al. | 244/173 |
| 4,425,905 | 1/1984 | Mori | 126/439 |
| 4,529,830 | 7/1985 | Daniel | 244/173 |
| 4,572,161 | 2/1986 | Mori | 126/440 |
| 4,588,151 | 5/1986 | Mori | 244/173 |
| 4,630,791 | 12/1986 | Chapman | 244/173 |
| 4,634,086 | 1/1987 | Mori | 244/173 |
| 4,717,227 | 1/1988 | Mori | 244/173 |
| 4,815,443 | 3/1989 | Vrolyk et al. | 126/438 |

*Primary Examiner*—Galen Barefoot

[57] ABSTRACT

A modular distributed concentrating collector using a low loss power bus to route solar radiation collected from a plurality of concentrating and collecting dishes to a centralized converted for conversion into electricity in space. The power bus may utilize fiber optic bundles. The collector includes a plurality of adjustable solar collectors to provide optimum tracking of the sun. The arrangement can be folded for stowing in the payload bay of the Space Shuttle or other launch vehicle for transport to a location in space.

11 Claims, 3 Drawing Sheets

MODULAR DISTRIBUTED CONCENTRATING COLLECTOR USING POWER BUS TO ROUTE POWER TO CENTRALIZED CONVERTER

This application is a continuation of application Ser. No. 07/414,491, filed Sep. 28, 1989, now abandoned.

BACKGROUND OF THE INVENTION

1. Field of the Invention

This invention relates generally to an improvement in the collection of solar energy for conversion into electricity for use in space and more particularly, but not by way of limitation, to an arrangement utilizing a plurality of solar radiation concentrating collectors that direct collected solar radiation by a low loss power bus to a centralized converter for conversion into electricity.

2. Description of the Invention

The use of dynamic converters in space has been proposed as a means of improving the efficiency of conversion of sunlight into electricity. Economies of scale that are needed in the turbogenerators that are used to convert heat into electricity have led to the use of centralized heat receivers that are fed by large concentrating collectors that are approximately twenty to thirty meters in diameter. If a single large concentrating collector is used then it must be capable of being segmented and folded into a compact package for stowing in a suitable launch vehicle for launch into space.

Such collectors also have difficulty in attaining the required accuracy for achieving a high concentration ratio. Such a high concentration ratio is needed to minimize the entrance aperture size and thus the level of re-radiation loss at the heat receiver. An upper limit of approximately 1000 for a concentration ratio has been postulated. Research performed by J. M. Cariou, et al. for the French National Solar Research Center has demonstrated the transmission of concentrated solar flux through single optical fiber strands. In their experiment, they collected concentrated sunlight from six small parabolic dishes and transmitted the power to a simple enclosed furnace. Their results included achieving a furnace temperature of 600 degrees C. with a total power of only 9 watts collected.

Analytical work performed by Daisuke Kato and Takashi Nakamura at the Electrotechnical Laboratory of the Japanese Ministry of International Trade and Industry determined that fused silica optical fibers could transmit solar radiation effectively, that is in excess of 90% efficiency, over distances of about forty meters. U.S. Pat. No. 4,026,267 issued to Richard Coleman describes the use of optical fibers to bus concentrated energy into a residential home for use as a space heating system. However, the system described in the noted patent of Richard Coleman did not consider bussing the power to a centralized converter for the generation of electricity. None of these noted efforts were oriented towards solving the problem of packaging and aligning large concentration collectors for use in solar dynamic converters in space.

SUMMARY OF THE INVENTION

In accordance with the present invention, there is provided a modular distributed concentrating collector using a power bus to route power to a centralized converter for generating electricity for use by a spacecraft. The invention contemplates using an array of relatively small collectors, less than five meters in diameter, to concentrate and collect solar radiation and then bussing the energy from each collector to a centralized converter. By using a number of smaller, more easily manufactured collectors that can be individually pointed and aligned, the requirements for high accuracy in deploying and maintaining large concentrator structures in space are alleviated. Means are provided to bus the solar radiation from each concentrating collector to the centralized receiver. One approach is to use broadband fiber optic bundles. The fiber-optic approach eliminates re-radiation of energy which occurs with the conversion of light into heat in external or open cavity heat receivers. This approach places one end of an optical fiber at the focus of the solar radiation concentrating dish for collection of the focussed light which is then transmitted by total internal reflection to a centralized converter where the light is converted to heat and then into electricity in a turbogenerator. Alternatively, the light may be converted directly into electricity with a photovoltaic converter.

Another approach to collecting the concentrated sunlight from the plurality of small collecting dishes is to utilize heat pipes. In the heat pipe approach, the evaporator end of a heat pipe is placed at the focus of each concentrating collector, and the energy is transmitted as heat in the evaporated fluid within the heat pipe of a centralized converter for conversion into electricity.

Other features and attendant advantages of the present invention will become apparent to those skilled in the art from a reading of the following detailed description constructed in accordance with the accompanying drawings and wherein:

DESCRIPTION OF THE PREFERRED EMBODIMENT

Figure 1:
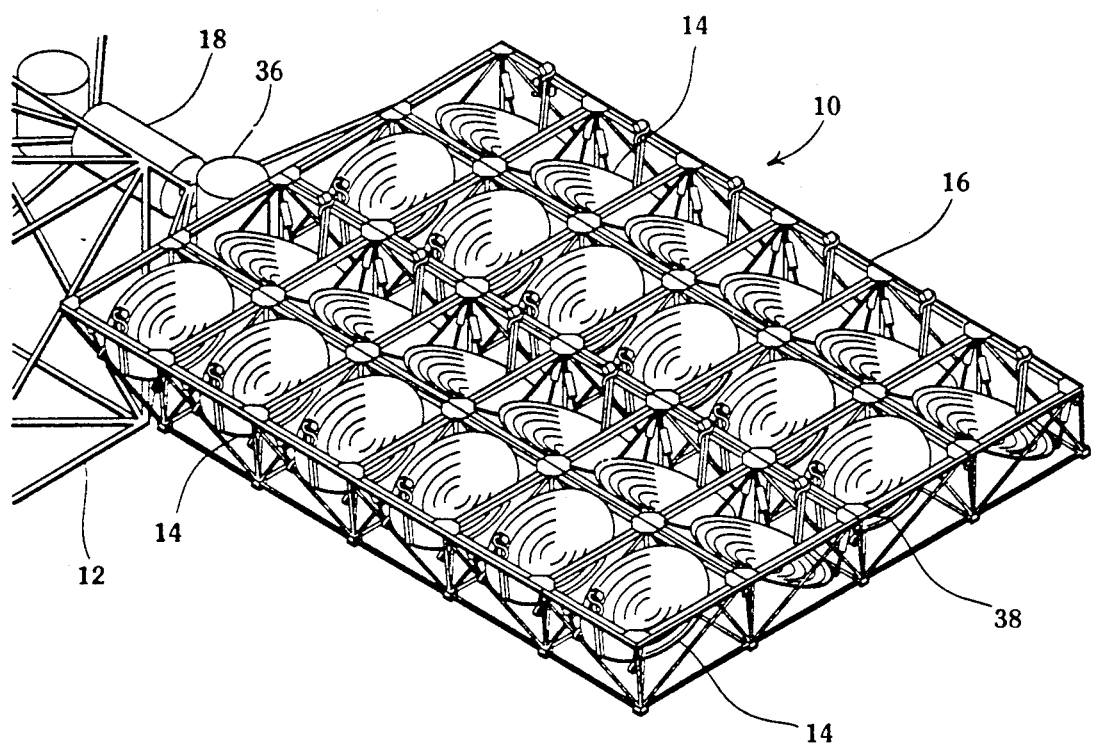
FIG. 1 illustrates a preferred embodiment of a modular distributed concentrating collector using a power bus to route power to a centralized converter constructed in accordance with the principles of the present invention.

Referring now to the drawings in detail and in particular to FIG. 1, the reference character 10 generally designates a modular distributed concentrating collector using a power bus to route power to a centralized converter for conversion into electricity for use by a spacecraft constructed in accordance with a preferred embodiment of the invention. As an example of a spacecraft upon which the arrangement 10 may be used, the reference character 12 generally designates a space station that is positioned in earth orbit. To provide the electrical needs of the space station 12 the arrangement 10 of the present invention is carried from earth by the Space Shuttle or some other suitable launch vehicle.

A separated means arranged to collect solar radiation is provided. In the preferred embodiment of the invention this means takes the form of a plurality of separated solar radiation concentrating collectors 14 that are arranged in a predetermined pattern. As illustrated in FIG. 1, these collectors 14 are arranged in a planar array to optimally receive solar radiation incident to one face of the array.

Each collector 14 is preferably an off-axis paraboloidal dish that is approximately three meters in diameter. Such a dish 14 can be fabricated from a single piece of material using conventional mirror manufacturing techniques, such as electroforming of nickel, or milling and polishing of cast aluminum.

The collectors 14 are carried by a support frame 16 which is coupled to the spacecraft 12 in any suitable manner. The support frame 16 is provided with a coarse tracking rotary joint means 18 which provides a rough orientation of the array of dishes 14 towards the sun. Each dish 14 is also provided with a fine means to align the dish with the sun. A pair of tracking actuators 20, as seen most clearly in FIG. 2, pivot each dish 14 on an associated pivot 22 to provide the fine or vernier tracking needed to accurately point the dishes 14 normal to incoming sunlight, a requirement for achieving high geometrical concentration ratio. The geometrical concentration ratio is defined as the aperture of the dish 14 divided by the aperture of the target used for collection of the concentrated flux.

Figure 2:
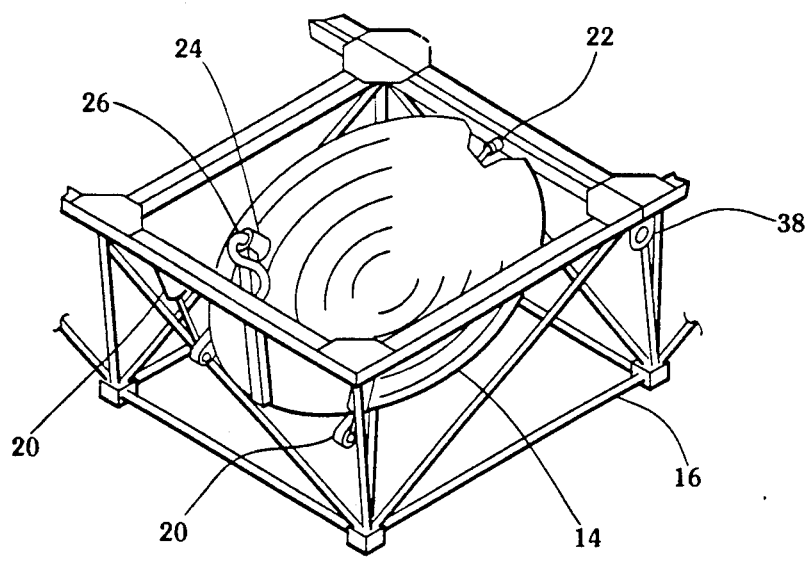
FIG. 2 is an enlarged detail of a concentrator mirror/bus module that is used to advantage in the representation of the invention in FIG. 1.
Figure 3:
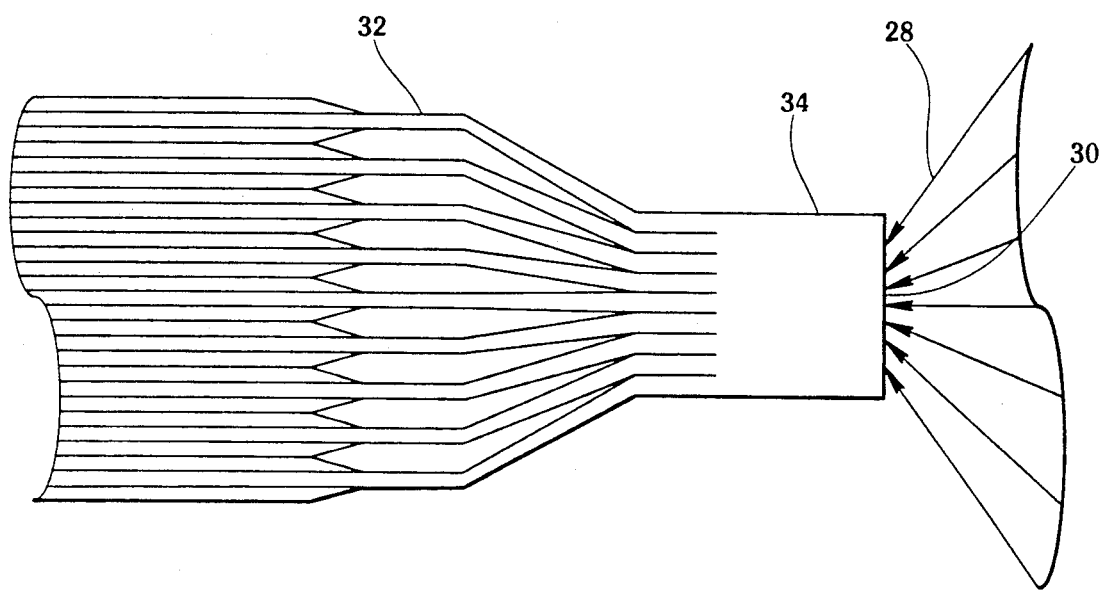
FIG. 3 is a fragmentary schematic of the fiber optic bus which illustrates the power bus entrance aperture.

A preferred means to gather the solar radiation received by each dish 14 contemplates a fiber optic bundle bus means. As seen in FIG. 2 each dish 14 has positioned at its focal point the entrance aperture 24 for a fiber optic power bus 26. Referring now to FIG. 3, it will be seen that the flux 28 from a concentrator dish 14 is received on a surface 30 that is made from a bundle of optic fibers 32 whose ends have been stripped and fused into a contiguous surface 30 to provide maximum transmission of incident flux into the denser fiber optic media. As shown in FIG. 3, individual fibers of around 10 mils in diameter are shown fused to provide a larger target aperture size of several square millimeters to allow a reasonable concentration ratio and size for each dish 14.

From the surface 30 which is provided by a fiber optic bundle having the sheaths stripped and the fibers twisted and fused together in a unitary mass 34 the fiber optic strands 32 divide up into individual strands, each with an appropriate sheathing to maintain total internal reflection. The bundles of individual strands 32 are used to improve the flexibility of the power bus 26 which in turn allows routing of the various busses 26 to a single centralized converter 36 for conversion into electricity. In the centralized converter 36 the received concentrated sunlight may be converted to heat and then into electricity in a suitable turbogenerator or the received sunlight may be converted directly into electricity with a photovoltaic converter.

Figure 4:
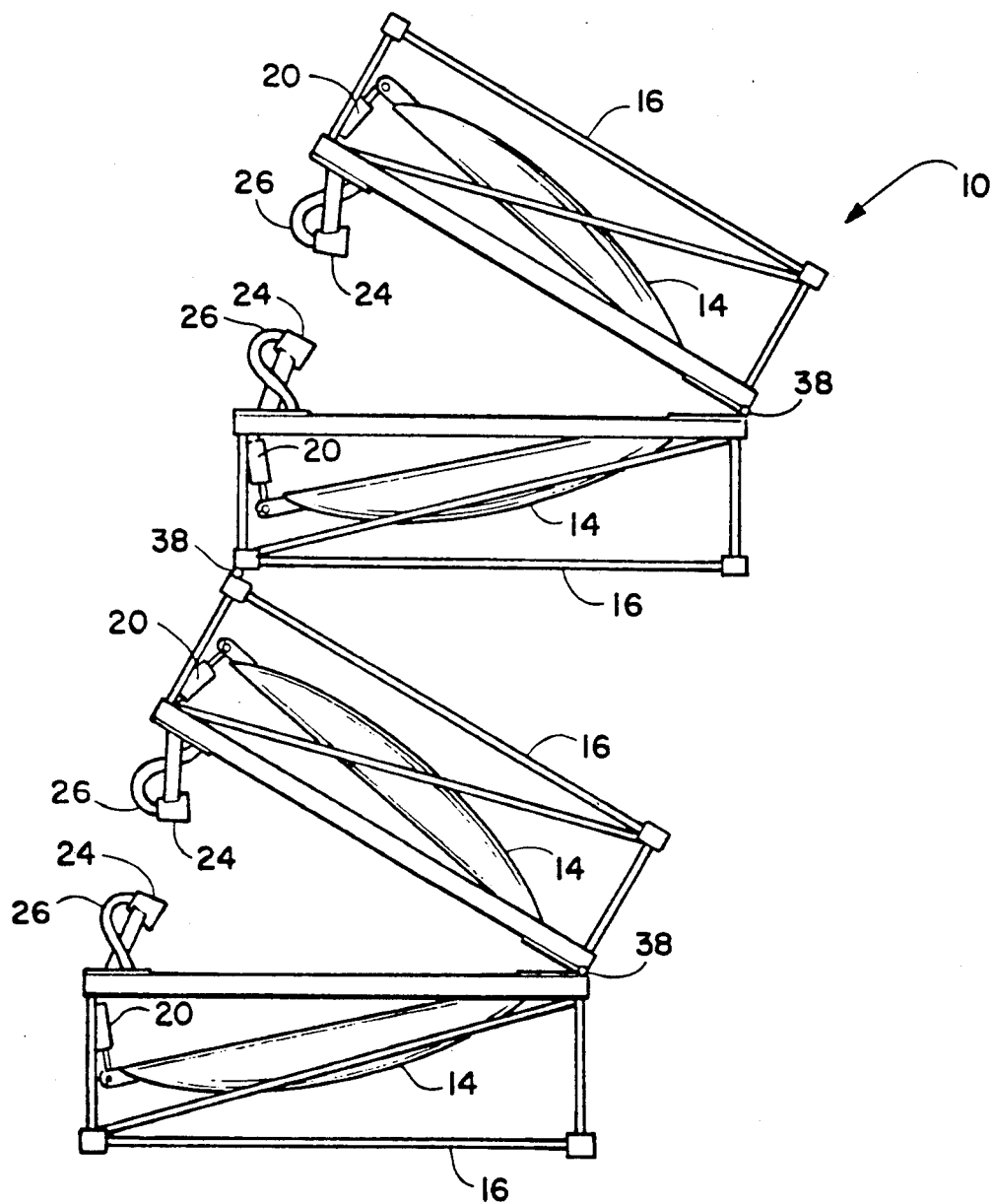
FIG. 4 is a side view showing of the collectors 14 in a partial accordion folded position.

It should be noted at this point that the particular support frame 16 supports the concentrator dishes 14 in a tilted arrangement, as seen in FIG. 1, to reduce their cross sectional area. The support frame 16 is provided with suitable pivot means 38 to permit the folding of the entire array of dishes 14, including the attached power collection busses 26, into a compact package for launch into space. When the array of tilted dishes 14 have been folded, accordion style as shown in drawing FIG. 4, into a compact rectangular solid it may be stowed in the storage bay of the Space Shuttle or a payload bay of an expendable launch.

While the preferred embodiment of the invention has been described with a certain amount of particularity, it is to be understood that such description is made by way of illustration and not limitation. Thus, other variations that have certain advantages are also within the scope of this invention. Such other variations could include arrays of concentrators comprising on-axis paraboloidal reflectors, fresnel reflectors, or fresnel lenses to improve the ease of manufacturing and/or the concentration ratio achievable with each concentrator dish. The particular module size which was disclosed as around three meters in diameter, could also be varied to account for different manufacturing and/or packaging schemes. Also, the power collection bus could comprise a set of flexible heat pipes, whose evaporator ends are placed at the focus of each dish, and whose condenser ends are connected "daisy chain" into other heat pipes, eventually ending up at a centralized heat receiver, which can convert the heat into electricity for use by a spacecraft. Alternatively, the flexible fiber optics bundle could be replaced by rigid, thick rods made of fused silica or other appropriately transparent material, using mirrors or retroreflectors to bus the energy to the centralized converter.

Accordingly, it is to be understood that conventional and obvious substitutions, modifications and reversal of parts may be resorted to without departing from the spirit or scope of the invention as defined by the invention as claimed.

What is claimed is:

1. An arrangement adapted to be carried into space by a launch vehicle and to generate electricity in space, the arrangement comprising:

a plurality of separated solar radiation collection means arranged to concentrate and collect solar radiation;

a first rotational support means for supporting and positioning said plurality of separated solar radiation collection means for coarse tracking of said plurality of separated solar tracking means towards the sun;

separate gathering means positioned remote from each of said solar radiation collection means to gather the solar radiation from each of said plurality of radiation collection means;

means adapted to receive the collected solar radiation from each of said plurality of gathering means and to convert it into electricity;

a plurality of separate supporting means, each of said plurality of support means supporting a plurality of said solar radiation collection means, each of said plurality of separate supporting means being interconnected and adapted to be carried in a accordion folded together space saving configuration within a launch vehicle for transport into space and to support said plurality of collection means when in an unfolded position in a predetermined arrangement in space; and a combination pivotal supporting means attached to said plurality of separate supporting means for individually supporting and fine tracking for each of said plurality of separated solar radiation collection means to precisely orient each of said separate solar collection radiation means normal to the incident sunlight.

2. The arrangement for generating electricity in space of claim 1 wherein solar radiation collection means comprises a plurality of separated off-axis paraboloidal solar radiation concentrating collectors that are arranged in a predetermined pattern.

3. The arrangement for generating electricity in space of claim 2 wherein the collection means comprises bus means, said bus means being a bundle of optic fibers whose distal ends have been stripped and fused into a contiguous surface to provide maximum transmission of concentrated solar radiation from each concentrating collector and to direct such collected radiation to the converter means for conversion into electricity.

4. The arrangement for generating electricity in space of claim 3 wherein the collection means further comprises a plurality of low loss broadband fiber optic bundles, each fiber bundle having one end positioned at the focal point of a solar radiation concentrating collector to receive concentrated solar radiation.

5. The arrangement for generating electricity in space of claim 4 wherein each fiber optic bundle is separable into a plurality of individual sheathed optic fibers to preclude loss of solar radiation and to permit such radiation to be transmitted by total internal reflection to the conversion means.

6. The arrangement for generating electricity in space of claim 3 wherein the means to convert the solar radiation into electricity includes means to convert the collected solar radiation into heat and means to convert the heat into electricity.

7. The arrangement for generating electricity in space of claim 3 wherein the means to convert the solar radiation into electricity comprises a turbogenerator.

8. The arrangement for generating electricity in space of claim 3 wherein the means to convert the solar radiation into electricity comprises means to convert the collected concentrated solar radiation directly into electricity.

9. The arrangement for generating electricity in space of claim 8 wherein the means to convert the collected concentrated solar radiation directly into electricity comprises a photovoltaic converter.

10. The arrangement for generating electricity in space of claim 3 wherein the support means comprises a framework that is adapted to support the plurality of solar radiation concentrating collectors in a planar array.

11. The arrangement for generating electricity in space of claim 10 wherein the support means includes pivoting means that permits sections of the planar array to be pivoted together to form a unitary package for transport.

* * * * *